H. E. ADAMS.
POULTRY HOUSING DEVICE.
APPLICATION FILED OCT. 7, 1918.
1,331,040.
Patented Feb. 17, 1920.
2 SHEETS—SHEET 2.
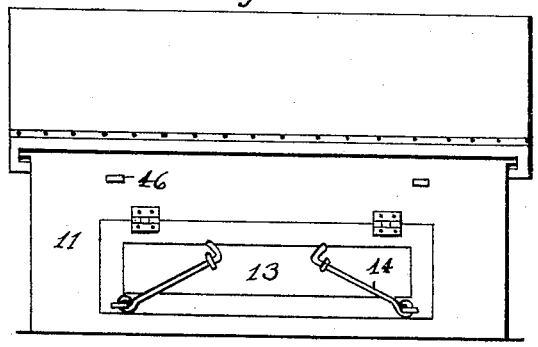
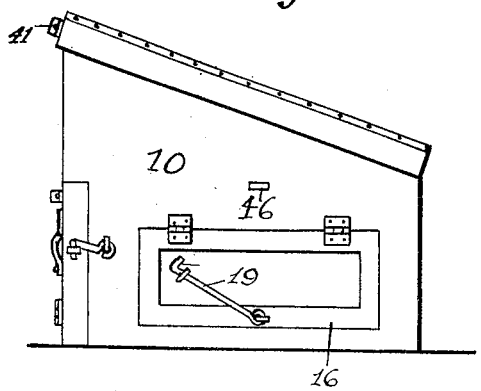
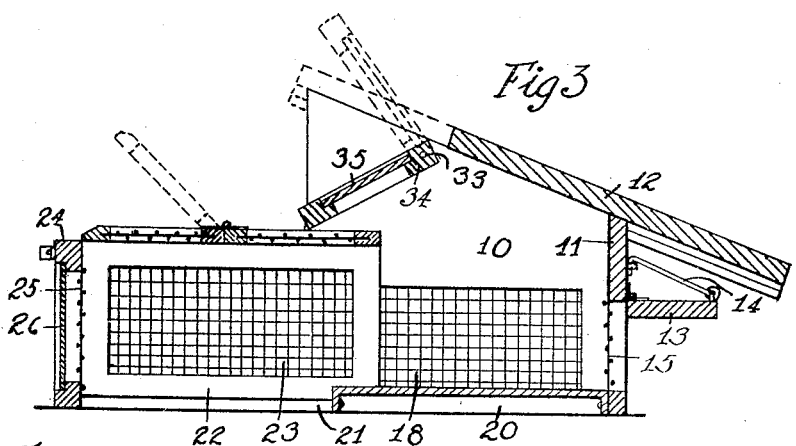
Witness
Lynn Latta
Inventor
Harriet E. Adams.
By Orwig + Bair Attys.

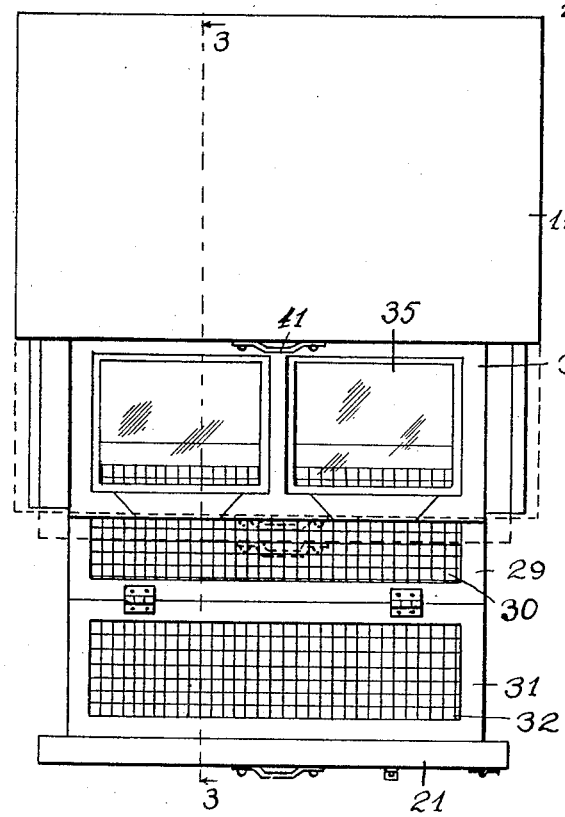
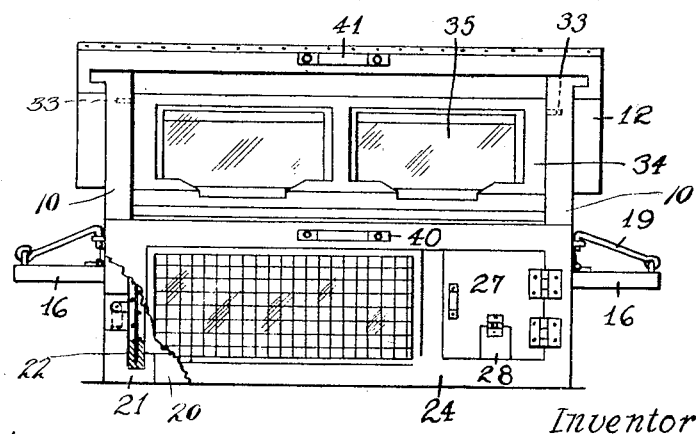

UNITED STATES PATENT OFFICE.

HARRIET E. ADAMS, OF WOODWARD, IOWA.

POULTRY HOUSING DEVICE.

1,331,040. Specification of Letters Patent. Patented Feb. 17, 1920.

Application filed October 7, 1918. Serial No. 257,295.

*To all whom it may concern:*

Be it known that I, HARRIET E. ADAMS, a citizen of the United States, and resident of Woodward, in the county of Dallas and State of Iowa, have invented a certain new and useful Poultry Housing Device, of which the following is a specification.

My invention relates to housing devices for young chickens.

The object of my invention is to provide a brooder of simple, durable and inexpensive construction, so constructed and arranged and having such parts as to permit adjustment for allowing the chicks a runway on the ground adjacent to the brooder proper, and to permit the free admission of air and sunlight to the chicks.

With these and other objects in view, my invention consists in the construction, arrangement and combination of the various parts of the device, whereby the objects contemplated are attained, as hereinafter more fully set forth, pointed out in my claims and illustrated in the accompanying drawings, in which:

Figure 1 shows a front elevation of the brooder, parts being broken away for illustrating the construction.

Fig. 2 shows a top or plan view of the same, with the cage partially withdrawn.

Fig. 3 shows a sectional view taken on the line 3—3 of Fig. 2.

Fig. 4 shows a side elevation of the brooder.

Fig. 5 shows a rear elevation of the same.

My improved brooder consists of a box-like structure comprising spaced end walls which I have indicated by the reference character 10, and a rear wall 11. The upper edges of the end walls are inclined from their rear portions upwardly and forwardly, as illustrated in Fig. 3, and there is slidably mounted on said upper edges a cover member 12.

In the rear wall is a hinged door 13, provided with suitable fastening devices 14. The rear and side walls of the frame of the brooder may be provided with screw eyes or the like 46, for coacting with the fastening members 14 and 19, as illustrated, for instance, in Figs. 1 and 3. Covering the rear wall door opening is a mesh screen or the like 15.

The side walls are provided with suitable hinged doors 16, and the door openings therefor are covered with similar mesh screen wire 18. The side doors may be provided with suitable fastening devices 19.

The brooder is preferably provided with a sheet metal bottom 20, which may be readily and easily scrubbed and cleaned.

Slidably mounted in guide-ways 21 at the bottom of the brooder at the sides thereof, are the side walls 22 of a three-sided cage. The side walls 22 have openings covered by meshed screen wire 23. The front wall 24 of the cage is provided with an opening covered by a meshed screen wire 25, and also with a glass pane 26 outside the wire 25. The front wall is also provided with a hinged door 27, through which access may be had to the interior of the brooder or which may be opened to permit the chicks to go in and out. The door 27 is preferably provided with a small hinged door 28.

The cage is provided with a fixed top member 29, having an opening covered by meshed screen wire 30, with a hinged cover member 31 having an opening provided with meshed screen wire 32. Mounted on the inside of the forward part of the side walls 10 and pivotally connected with said side walls by means of pins 33 or the like, near the forward portions of the side walls, is a frame 34 having panes of glass 35 set therein.

In the practical use of the brooder, the chicks are placed therein. The frame 34 is ordinarily inclined downwardly and forwardly from its hinged edge, as illustrated in Fig. 3. If it is desired to give the chicks more sunlight, the cover 12 is slid rearwardly, as illustrated in Fig. 3, so that the sunlight can enter through the glass panes 35. If it is desired to allow more air, the frame 34 may be raised, as shown in dotted lines in Fig. 3. Frequently it is desirable to raise the frame 34, but if the weather is rainy the frame 34 may be left in the position shown by full lines in Fig. 3, to allow the sun to shine into the brooder without the admission of rain therein, as, for instance, where the brooder must be left for several hours and cannot be taken care of if a shower should occur. If it is desired to allow more air, the side doors and rear door may be opened.

If the user desires to give the chicks a runway in front of the brooder, the three-sided cage is drawn out, or partially out, of the brooder, as shown in Fig. 3, whereupon the chicks can run on the ground in front of the brooder and within the cage. The hinged cover member 31 may be quickly and easily raised at any time to allow access to the interior of the cage or the brooder. The cage may be left in any of a variety of positions partially slid out of the brooder.

Suitable handles 40 and 41 may be provided for the cage and cover members 12.

The cage may be entirely drawn out of the brooder for permitting easier cleaning of the brooder. The cover 12 may be completely removed when desired.

Some changes may be made in the construction and arrangement of the various parts of my improved brooder without departing from the essential features and purposes of my invention, and it is my intention to cover by my claims any modified forms of structure or use of mechanical equivalents which may be reasonably included within their scope.

I claim as my invention:

1. In a brooder, a coop comprising a bottom, a back, side walls, an inclined cover member mounted on the side walls for reciprocation, an inclined transparent front member, and means for pivotally connecting the upper portion of the last described member to the side walls intermediate of their ends, whereby the cover may be selectively moved to position above the front member and to position with its front edge adjacent to the upper edge of the front member, and the front member may be swung on its pivots selectively to closed and to opened position.

2. In a brooder, the combination of a substantially rectangular coop having a bottom, side walls, and front and back members, with an inclined cover slidably mounted on the upper edges of the side walls, an inclined auxiliary front member having portions thereof formed of transparent material, and means for pivotally connecting the upper portion of the last described member to the side walls intermediate of their ends, whereby the cover may be selectively moved to position above the auxiliary front member and to position with its front edge adjacent to the upper edge of the auxiliary front member, and the auxiliary front member may be swung on its pivots selectively to closed and to opened position.

Des Moines, Iowa, August 24, 1918.

HARRIET E. ADAMS.